United States Patent
Ishii et al.

(10) Patent No.: US 8,529,844 B2
(45) Date of Patent: *Sep. 10, 2013

(54) APPARATUS FOR PRODUCING TRICHLOROSILANE AND METHOD FOR PRODUCING TRICHLOROSILANE

(75) Inventors: Toshiyuki Ishii, Yokkaichi (JP); Eiji Komai, Yokkaichi (JP); Harumi Satoh, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/345,864

(22) Filed: Jan. 9, 2012

(65) Prior Publication Data

US 2012/0107190 A1     May 3, 2012

Related U.S. Application Data

(62) Division of application No. 12/461,148, filed on Aug. 3, 2009, now Pat. No. 8,187,552.

(30) Foreign Application Priority Data

Aug. 5, 2008    (JP) ................................. 2008-201863

(51) Int. Cl.
    *B01J 19/00*      (2006.01)
    *C01B 33/107*    (2006.01)

(52) U.S. Cl.
    USPC ........... 422/198; 422/202; 422/205; 422/228; 422/229; 423/342

(58) Field of Classification Search
    USPC .......... 422/198, 202, 205, 228, 229; 423/342
    See application file for complete search history.

(56) References Cited

U.S. PATENT DOCUMENTS

| 1,920,632 | A | * | 8/1933 | Daniels ......................... 422/639 |
| 2,079,017 | A | | 5/1937 | Iddings et al. |

(Continued)

FOREIGN PATENT DOCUMENTS

| DE | 10032302 A1 | 10/2001 |
| EP | 2096082 A1 | 9/2009 |

(Continued)

OTHER PUBLICATIONS

Office Action mailed Sep. 12, 2011, issued for the related U.S. Appl. No. 12/461,147.

(Continued)

*Primary Examiner* — Jennifer A Leung
(74) *Attorney, Agent, or Firm* — Edwards Wildman Palmer LLP (57) ABSTRACT

An apparatus for producing trichlorosilane includes: a decomposing furnace, a heating unit heating the inside of the decomposing furnace, a raw material supplying tube for guiding polymer and hydrogen chloride to be guided to the inner bottom portion of the decomposing furnace, and a gas discharge tube for discharging reaction gas from the top of the reaction chamber provided between the outer peripheral surface of the raw material supplying tube and the inner peripheral surface of the decomposing furnace, a fin, which guides a fluid mixture of the polymer and the hydrogen chloride supplied from the lower end opening of the raw material supplying tube to be agitated and rise upward in the reaction chamber, and is formed integrally with at least one of the outer peripheral surface of the raw material supplying tube and the inner peripheral surface of the decomposing furnace.

18 Claims, 8 Drawing Sheets

(56) References Cited

U.S. PATENT DOCUMENTS

| | | | |
|---|---|---|---|
| 2,855,449 | A | 10/1958 | Owen |
| 3,607,125 | A | 9/1971 | Kydd |
| 3,945,805 | A | 3/1976 | Costello et al. |
| 3,945,806 | A | 3/1976 | Costello et al. |
| 4,009,751 | A | 3/1977 | Zelnik |
| 4,098,972 | A | 7/1978 | Ogawa et al. |
| 4,332,296 | A | 6/1982 | Wayt |
| 4,590,044 | A | 5/1986 | Mos et al. |
| 4,969,942 | A | 11/1990 | Schwenninger et al. |
| 6,066,759 | A | 5/2000 | Heider et al. |
| 6,291,698 | B1 | 9/2001 | Bade et al. |
| 6,299,511 | B1 | 10/2001 | Gurusamy et al. |
| 6,846,473 | B2 | 1/2005 | Kirii et al. |
| 8,187,551 | B2 * | 5/2012 | Ishii et al. .................. 422/198 |
| 8,187,552 | B2 * | 5/2012 | Ishii et al. .................. 422/198 |
| 2004/0091412 | A1 | 5/2004 | Muller et al. |
| 2004/0131528 | A1 | 7/2004 | Kendig et al. |
| 2004/0175323 | A1 | 9/2004 | Franz et al. |
| 2008/0095691 | A1 | 4/2008 | Sonnenschein et al. |
| 2009/0220403 | A1 | 9/2009 | Tachino et al. |
| 2010/0034721 | A1 | 2/2010 | Ishii et al. |
| 2012/0100044 | A1* | 4/2012 | Ishii et al. .................. 422/198 |
| 2012/0107190 | A1 | 5/2012 | Ishii et al. |

FOREIGN PATENT DOCUMENTS

| | | |
|---|---|---|
| JP | 62-123011 A | 6/1987 |
| JP | 1-188414 A | 7/1989 |
| RU | 2004124875 A | 1/2006 |
| SU | 1422571 A1 | 8/1999 |
| WO | WO-02/12122 A1 | 2/2002 |
| WO | WO-2008018760 A1 | 2/2008 |

OTHER PUBLICATIONS

European Search Report dated Nov. 16, 2009, issued on the corresponding European patent application No. 09 16 7090.1.

Office Action mailed Aug. 3, 2012, issued for the Chinese Patent Application No. 200910163836.2 and English translation thereof.

Office Action mailed Jun. 18, 2012, issued for U.S. Appl. No. 13/343,249.

Office Action mailed Dec. 19, 2012, issued for U.S. Appl. No. 13/458,130.

U.S. Office Action dated Dec. 19, 2012 for U.S. Appl. No. 13/456,351.

Notice of Allowance mailed May 14, 2013, issued for the Russian patent application No. 2009129709 and English translation thereof.

* cited by examiner

APPARATUS FOR PRODUCING TRICHLOROSILANE AND METHOD FOR PRODUCING TRICHLOROSILANE

This application is a divisional application of U.S. application Ser. No. 12/461,148, filed Aug. 3, 2009, now U.S. Pat. No. 8,187,552 which claims the right of priority under 35 U.S.C. §119 based on Japanese Patent Application No. 2008-201863 filed Aug. 5, 2008.

BACKGROUND OF THE INVENTION

1. Field of the Invention

The present invention relates to a producing apparatus for decomposing and converting high boiling point chlorosilanes-containing materials (hereinafter, referred to as polymer) generated in a polycrystalline silicon producing process and in a trichlorosilane producing or converting process into trichlorosilane, and more particularly, to an apparatus for producing trichlorosilane by decomposing a polymer produced in a chlorination process, a polymer separated from an exhaust gas of a reaction process of polycrystalline silicon, or a polymer produced in a conversion process for producing trichlorosilane from silicon tetrachloride in an exhaust gas, and a method for producing trichlorosilane.

Priority is claimed on Japanese Patent Application No. 2008-201863, filed on Aug. 5, 2008, the content of which is incorporated herein by reference.

2. Description of Related Art

High-purity polycrystalline silicon used for semiconductor materials are mainly produced by the Siemens process using trichlorosilane ($SiHCl_3$: TCS) and hydrogen as the raw materials. The Siemens process is a process of introducing a gas mixture of trichlorosilane and hydrogen into a reactor so as to come in contact with a glowing silicon rod, and depositing silicon on the surface of the silicon rod due to the hydrogen reduction and thermal decomposition of trichlorosilane at high temperature. For the high-purity trichlorosilane introduced into the reactor, for example, high-purity trichlorosilane obtained by distilling and purifying crude trichlorosilane obtained through a chlorination process is used. The chlorination process is a process for introducing metallurgical silicon and hydrogen chloride into a fluidizing chlorination furnace so as to react with each other and produce crude trichlorosilane using the chlorination of silicon.

In the producing of polycrystalline silicon, gases discharged from the reactor include unreacted trichlorosilane, hydrogen chloride, silicon tetrachloride (STC) as a byproduct, and chlorosilanes (referred to as high boiling point chlorosilanes) having higher boiling points than silicon tetrachlorides such as tetrachlorodisilane ($Si_2H_2Cl_4$) and hexachlorodisilane ($Si_2Cl_6$) (refer to WO02/012122). In addition, crude trichlorosilane can be produced from silicon tetrachloride and hydrogen in the discharged gas by using a converter (conversion process). The distilled and purified crude trichlorosilane obtained in the conversion process have been reused. Gas produced in the chlorination furnace and the converter contains hydrogen chloride, silicon tetrachloride, and high boiling point chlorosilanes in addition to trichlorosilane.

Conventionally, polymers are produced when the gas produced in the chlorination furnace or in the converter, or the gas discharged from the reactor, is collected and distilled. These polymers should be hydrolyzed and disposed of. Accordingly, there is a problem in that costs involved in the hydrolysis and waste disposal are expensive.

In addition, a method is known for returning polymers generated in the producing of polycrystalline silicon to a fluid reaction container to be separated and using the separated polymers to produce trichlorosilane (refer to JP-A-01-188414). However, in this method, silicon powder supplied to a fluidizing reactor is mixed with polymers, so that there are problems in that flowability of the silicon powder is degraded, and the conversion ratio of the polymer into chlorosilane is reduced.

SUMMARY OF THE INVENTION

The present invention is designed to solve the above-mentioned problems. An object of the present invention is to provide a producing apparatus for decomposing and converting polymers separated in a polycrystalline silicon producing process, and in a trichlorosilane producing or converting process, into trichlorosilane.

According to an aspect of the present invention, there is provided an apparatus for producing trichlorosilane which introduces, into a decomposing furnace, hydrogen chloride and polymer containing high boiling point chlorosilanes generated in a polycrystalline silicon producing process, in a trichlorosilane producing or in a converting process, and reacting them with each other at high temperatures such that the polymer decomposes, thereby producing trichlorosilane. The apparatus for producing trichlorosilane includes: in the decomposing furnace, a heating unit heating the inside of the decomposing furnace, a raw material supplying tube for guiding the polymer and the hydrogen chloride to the inner bottom portion of the decomposing furnace along the longitudinal direction of the decomposing furnace and supplying to the decomposing furnace through its lower end opening, a reaction chamber provided between the outer peripheral surface of the raw material supplying tube and the inner peripheral surface of the decomposing furnace, and a gas discharge tube for discharging reaction gas from the top of the reaction chamber. In addition, a fin is formed integrally with at least one of the outer peripheral surface of the raw material supplying tube or the inner peripheral surface of the decomposing furnace. The fin guides the fluid mixture including the polymer and the hydrogen chloride supplied from the lower end opening of the raw material supplying tube to be agitated and rise upward in the reaction chamber.

In the apparatus for producing trichlorosilane, since trichlorosilane is produced by decomposing polymer, trichlorosilane can be recovered by decomposing polymer separated in, for example, the polycrystalline silicon producing process. Therefore, in the apparatus for producing trichlorosilane, the burden due to the waste disposal of the polymer using hydrolysis can be significantly reduced. In addition, since the recovered trichlorosilane is reused, the use efficiency of the raw material is increased, so that it is possible to reduce the producing cost of polycrystalline silicon. In addition, since polymer and hydrogen chloride are agitated and rise upward to the top of the decomposing furnace while coming in contact with the fin in the reaction chamber on the outside of the raw material supplying tube, heat is also transferred from the fin for effective heating, and the temperature in the furnace can be uniformized, thereby achieving a highly efficient reaction. In addition, although silicon oxide is generated by a reaction between oxides contained in the polymer and moisture in the hydrogen chloride gas, as the reaction chamber is provided on the outside of the raw material supplying tube, it is possible to suppress the clogging up of the raw material supplying tube with the silicon oxide.

In the apparatus for producing trichlorosilane according to the aspect of the present invention, the raw material supplying tube may be provided along the center axis of the decomposing furnace in a straight manner.

With such a configuration, since the raw material supplying tube is provided in the straight manner, although silicon oxide adheres to the inner surface of the lower end opening of the raw material supplying tube, it is possible to easily perform a removal operation of the silicon oxide by inserting a bar-shaped member into the raw material supplying tube, or the like.

In the apparatus for producing trichlorosilane according to the aspect of the present invention, a polymer supplying system and a hydrogen chloride supplying system may be connected to an upper section of the raw material supplying tube which protrudes outward from the decomposing furnace, and an agitating member having a second fin may be inserted into the raw material supplying tube.

With such a configuration, the polymer and the hydrogen chloride can be mixed by the second fin in the raw material supplying tube before they are supplied to the reaction chamber, so that the reaction in the reaction chamber effectively occurs. In this case, when the agitating member moves vertically, although silicon oxide is adhered to the lower end opening of the raw material supplying tube and the inner bottom portion of the decomposing furnace, the silicon oxide can be crushed by moving the agitating member vertically, so that the silicon oxide can be easily removed.

In the apparatus for producing trichlorosilane according to the aspect of the present invention, the gas discharge tube may be formed in a double-tube structure to surround the periphery of the upper part of the raw material supplying tube on the outside of the decomposing furnace.

Gas discharged from the decomposing furnace after the reaction is at a high temperature. In the configuration in which the discharge tube of the high-temperature gas surrounds the raw material supplying tube, heat exchange is made between the polymer and the hydrogen chloride flowing through the raw material supplying tube and the gas flowing through the discharge tube. Therefore, the polymer or the like can be preheated before being introduced into the decomposing furnace, so that it is possible to enhance efficiency of the reaction between the polymer and the hydrogen chloride.

In the apparatus for producing trichlorosilane according to the aspect of the present invention, the decomposing furnace may be provided with a pressurized gas injection tube for injecting pressurized gas into the decomposing furnace and a furnace fluid discharge tube for discharging fluids in the furnace expelled by the pressurized gas.

With such a configuration, although silicon oxide generated by a reaction between oxides contained in the polymer and moisture in the hydrogen chloride gas is adhered to the decomposing furnace, the adhered silicon oxide can be removed by the pressurize gas by injecting the pressurized gas continuously or intermittently to clean the inside. As the pressurized gas, an inert gas, such as nitrogen or the like, may be used.

In the apparatus for producing trichlorosilane according to the aspect of the present invention, a number of spherical rolling members provided on the inner bottom portion of the decomposing furnace may further be included.

Since silicon oxide is more likely to be deposited on the inner bottom portion of the decomposing furnace, by inserting from the outside a bar-shaped member or the like to move the rolling members, the silicon oxide can be crushed, so that the removal operation thereof can be easily performed.

According to another aspect of the present invention, there is provided a method for producing trichlorosilane which introduces into a decomposing furnace hydrogen chloride and polymer containing high boiling point chlorosilanes generated in a polycrystalline silicon producing process or in a trichlorosilane producing process or in a trichlorosilane converting process, and reacting them with each other at high temperature such that the polymer decomposes, thereby producing trichlorosilane. The decomposing furnace is preheated, and the polymer and the hydrogen chloride are supplied from the top of the heated decomposing furnace and guided to the inner bottom portion of the decomposing furnace while being gasified due to the preheated the decomposing furnace. Thereafter, a fluid mixture of the polymer and the hydrogen chloride is agitated and reacts with each other while rising upward from the inner bottom portion in the decomposing furnace.

According to the aspects of the present invention, since trichlorosilane is produced by decomposing polymer, trichlorosilane can be recovered by decomposing polymer separated in, for example, the polycrystalline silicon producing process or the trichlorosilane producing process. Therefore, the burden of waste disposal of the polymer using hydrolysis can be significantly reduced. In addition, since the recovered trichlorosilane is reused, the use efficiency of the raw material is increased, so that it is possible to reduce the producing cost of polycrystalline silicon. In addition, since the polymer and the hydrogen chloride are agitated and rise upward to the top of the decomposing furnace while coming in contact with the fin in the reaction chamber on the outside of the raw material supplying tube, heat is also transferred from the fin for effective heating, and the temperature in the furnace can be uniformized, thereby achieving a highly efficient reaction. In addition, although silicon oxide is generated by the reaction, since the reaction chamber is provided on the outside of the raw material supplying tube, it is possible to suppress the clogging up of the raw material supplying tube by the silicon oxide.

DETAILED DESCRIPTION OF THE INVENTION

Hereinafter, exemplary embodiments of an apparatus for producing trichlorosilane ($SiHCl_3$: TCS) of the present invention will be described with reference to the accompanying drawings.

FIGS. 1 to 3B illustrate an apparatus for producing TCS according to a first embodiment. The apparatus for producing trichlorosilane 1 includes a cylindrical decomposing furnace 2 provided along in a longitudinal direction of the decomposing furnace, a raw material supplying tube 3 which is inserted from above on the decomposing furnace 2 to the inner bottom portion along the center axis C of the decomposing furnace 2, and a gas discharge tube 4 for discharging reaction gas from the top portion of the decomposing furnace 2.

Figure 1:
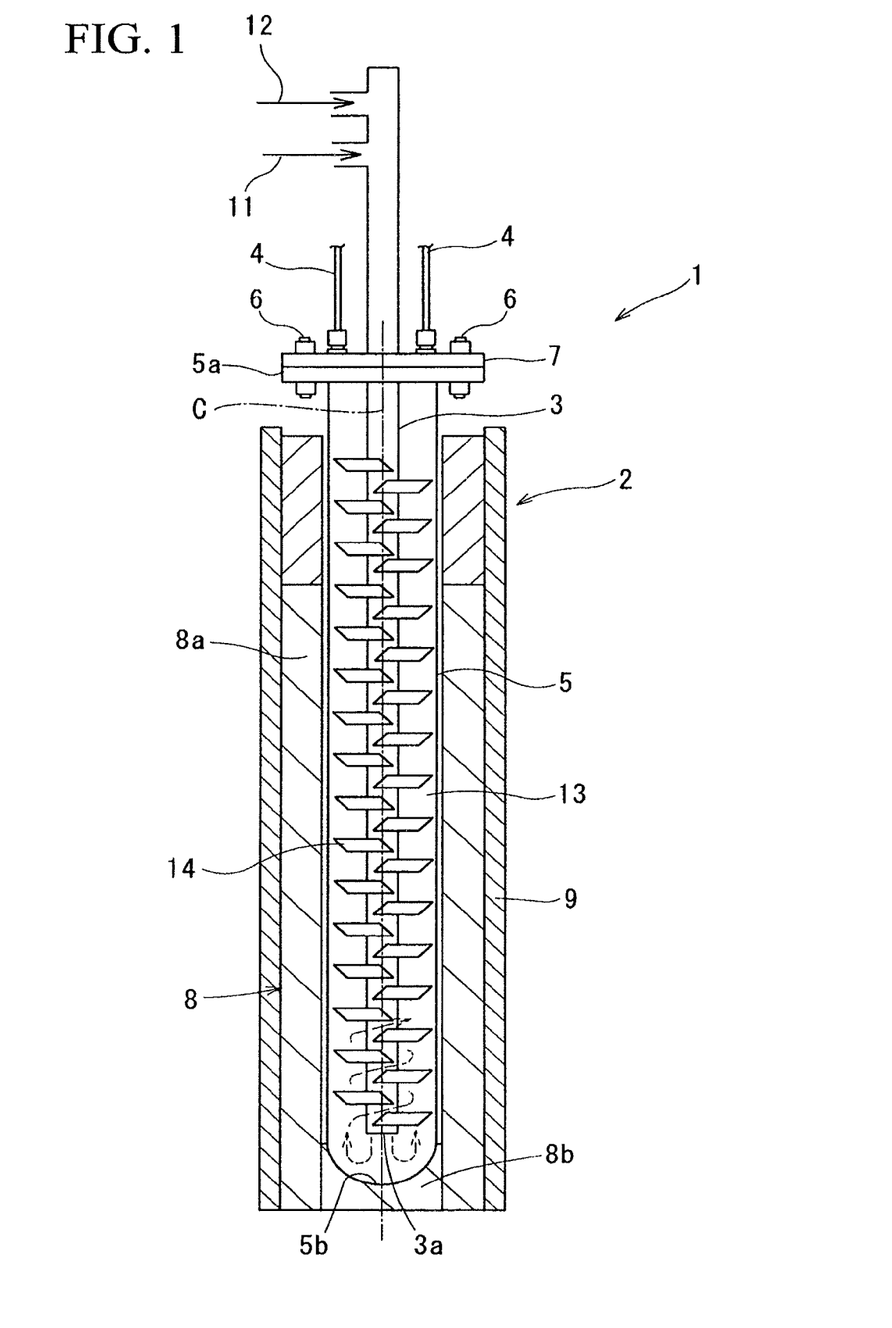
FIG. 1 is a longitudinal sectional view showing an apparatus for producing trichlorosilane according to a first embodiment of the present invention.
Figure 2:
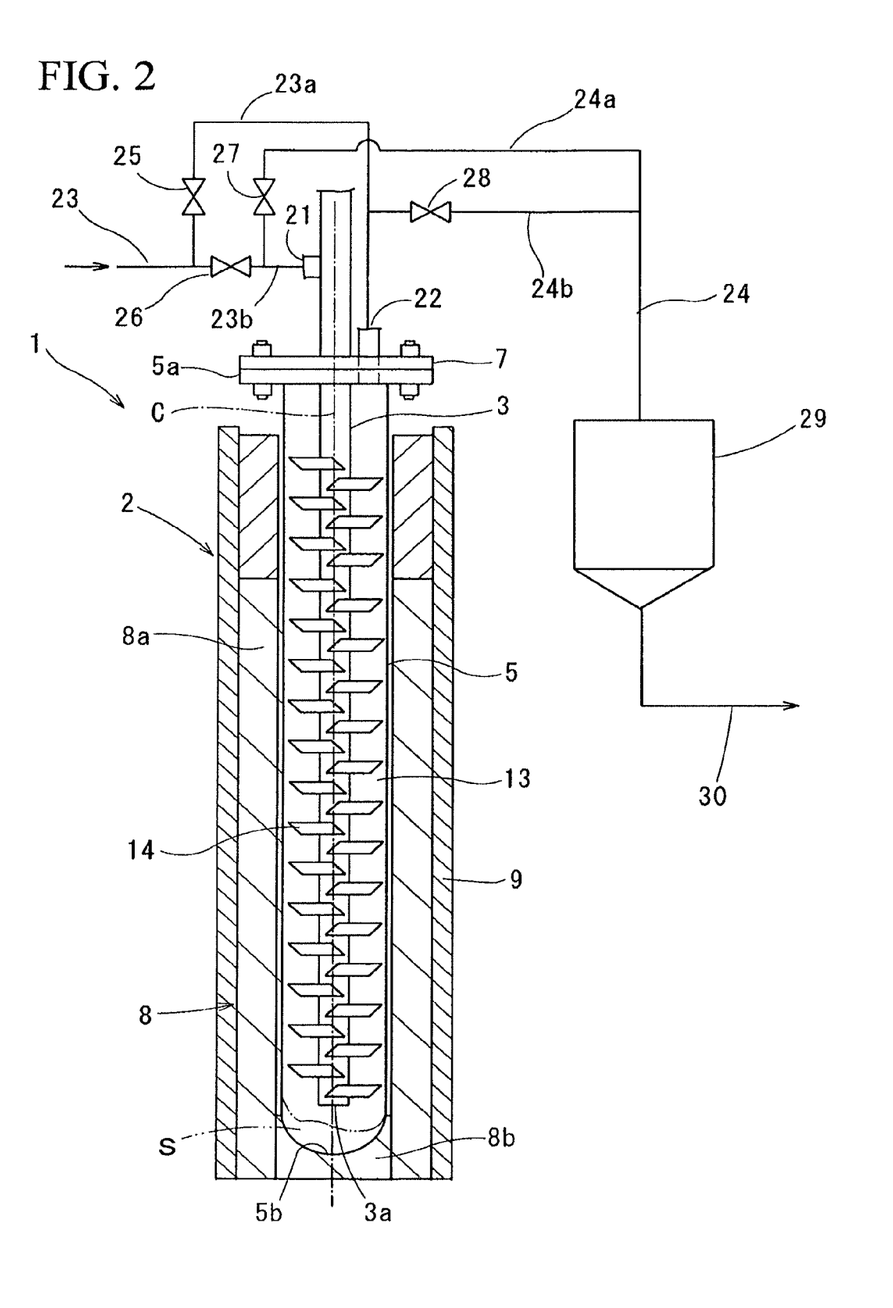
FIG. 2 is a longitudinal sectional view showing the apparatus for producing trichlorosilane of FIG. 1 when viewed from side.

The decomposing furnace 2 includes a furnace main body 5 which is bottomed-cylindrical and has a top flange 5a, an end plate 7 which is joined to the top flange 5a of the furnace main body 5 with bolts 6 which can be detached, and a heating unit 8 heating the inside of the furnace main body 5 from the periphery thereof. In addition, an inner bottom surface 5b of the furnace main body 5 is formed as a spherical concave surface.

The heating unit 8 includes a body-section heater 8a for surrounding the outer peripheral surface of the furnace main body 5 and the bottom-section heater 8b for covering the outer bottom surface of the furnace main body 5. In FIGS. 1 and 2, reference numeral 9 denotes a frame for covering the heating unit 8.

The raw material supplying tube 3 is formed as a straight cylinder, and penetrates through and is fixed vertically to the end plate 7 of the decomposing furnace 2 and protrudes from the top of the decomposing furnace 2. A polymer supplying system 11 and a hydrogen chloride supplying system 12 are connected to a base end portion (upper end portion). In addition, the insertion length of the raw material supplying tube 3 from the end plate 7 through the furnace main body 5 is slightly shorter than the depth of the furnace main body 5, so that a lower end opening 3a is slightly spaced from the inner bottom surface 5b of the furnace main body 5 when the end plate 7 is fixed to the top flange 5a of the furnace main body 5.

In addition, a cylindrical space formed between the outer peripheral surface of the raw material supplying tube 3, which is inserted into the decomposing furnace 2, and the inner peripheral surface of the furnace main body 5 of the decomposing furnace 2 is a reaction chamber 13. A fin 14 is fixed to the outer peripheral surface of the raw material supplying tube 3 exposed to the reaction chamber 13. The fin 14 is, for example, arranged as a spiral shape along the longitudinal direction of the raw material supplying tube 3. The outer peripheral end of the fin 14 is close to the inner peripheral surface of the furnace main body 5 such that the gap therebetween is small which substantially partitions the inside of the reaction chamber 13 into spiral spaces.

The two gas discharge tubes 4 are provided to the end plate 7 in the illustration to discharge from the decomposing furnace 2 gases that have been generated by reacting polymer and hydrogen chloride while rising upward in the reaction chamber 13.

As illustrated in FIG. 2, a communicating port 21 connected to the inside of the raw material supplying tube 3 is formed at a midstream position of the raw material supplying tube 3 protruding upward from the end plate 7, and a communicating port 22 connected to the reaction chamber 13 is provided in the end plate 7, in addition to the gas discharge tube 4. The communicating ports 21 and 22 are connected to a pressurized gas injection tube 23 and a furnace fluid discharge tube 24 through branch tubes 23a, 23b, 24a, and 24b. The pressurized gas injection tube 23 is used for injecting inert gas, nitrogen, or the like in a pressurized state into the raw material supplying tube 3 or the reaction chamber 13 through one of the communicating ports 21 and 22. The pressurized gas injection tube 23 is provided with valves 25 and 26 for switching between the passageways of the raw material supplying tube 3 and the reaction chamber 13. The furnace fluid discharge tube 24 is used for discharging fluids in the furnace which contain silicon oxide and are removed by the injection of pressurized gas from the raw material supplying tube 3 or the reaction chamber 13. The furnace fluid discharge tube 24 is provided with valves 27 and 28 for switching the passageways of the raw material supplying tube 3 or the reaction chamber 13. The furnace fluid discharge tube 24 is connected to a cyclone 29. Silicon oxide collected in the cyclone 29 is processed by a silicon oxide processing system 30.

The valves 25 to 28 of the pressurized gas injection tube 23 and the furnace fluid discharge tube 24 are closed during the operation of the decomposing furnace 2 and opened during maintenance, as described later, to clean the inside of the decomposing furnace 2. In addition, the communicating port 22 is provided separately from the gas discharge tube 4 illustrated in FIG. 1, however, the gas discharge tube 4 may also be used as the communicating port 22.

Figure 4:
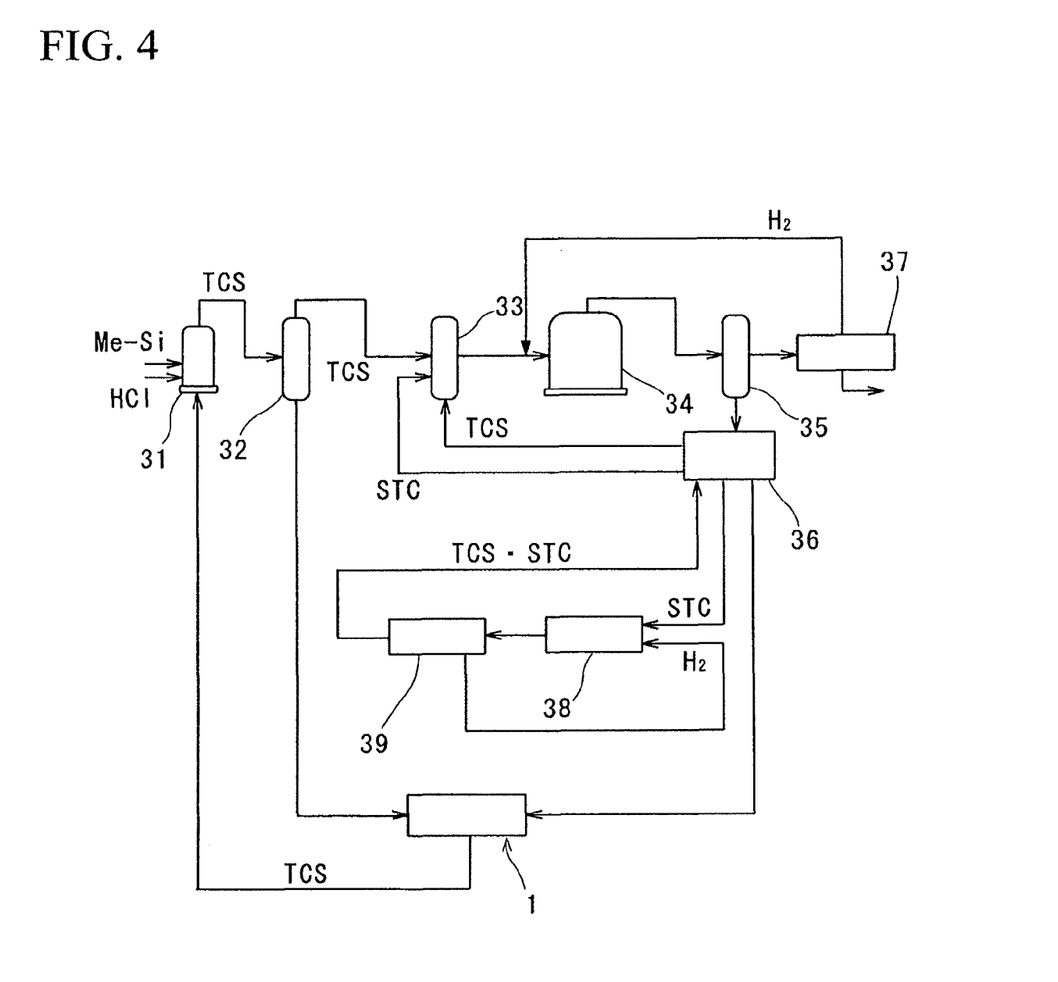
FIG. 4 is a flow diagram showing an example of a polycrystalline silicon producing process using an apparatus for producing trichlorosilane of the present invention.

Next, an example of a polycrystalline silicon producing process including the apparatus for producing trichlorosilane 1 is described with reference to FIG. 4. In the producing process illustrated, a fluidizing chlorination furnace 31 for producing crude TCS by reacting metallurgical silicon (Me-Si) and hydrogen chloride (HCl) with each other, a distillation column 32 for distilling of the produced gas containing the crude TCS which is produced in the fluidizing chlorination furnace 31, an evaporator 33 for evaporating the purified TCS with silicon tetrachloride (STC), and TCS recovered from subsequent processes so as to produce a raw material gas, a reactor 34 for producing polycrystalline silicon from the raw material gas supplied from the evaporator 33, and a condenser 35 for separating chlorosilanes from the exhaust gas of the reactor 34.

Chlorosilanes separated by the condenser 35 by liquefaction are introduced to a distillation system 36 including plural distillation columns, and are distilled in a stepwise to fractionate TCS, STC and the polymer. The TCS and STC recovered are returned to the evaporator 33 to be reused as raw material gas components. In addition, gas discharged from the condenser 35 contains hydrogen, hydrogen chloride, and the like and is introduced to a hydrogen recovery system 37 to separate hydrogen. The separated hydrogen is returned to the reactor 34 to be reused as a raw material gas.

Part of the STC from the distillation system 36 reacts with hydrogen ($H_2$) by a converter 38 and converted into TCS. The gas discharged from the converter 38 is processed so as to separate the hydrogen by a hydrogen recovery equipment 39, and the reaction gas containing TCS and STC is returned to the distillation system 36.

The raw material gas to which the STC is added, which is used for polycrystalline silicon producing process, is used in the evaporator 33. However, there may be a case where raw material gas without STC is used.

In the producing process, various polymers are contained in the distillation residues separated from the bottoms of the distillation column 32 after the chlorination process for producing TCS and the distillation column in the distillation system 36 after the reaction process for producing polycrystalline silicon or the conversion process for converting STC into TCS. The distillation residues (polymers or high boiling point chlorosilanes-containing materials) are decomposed by the apparatus for producing trichlorosilane 1 and converted into trichlorosilane. The obtained TCS is supplied to, for example, the fluidizing chlorination furnace 31 to be reused as the raw material for producing polycrystalline silicon.

Next, a method is described for producing TCS by decomposing polymers using the apparatus for producing trichlorosilane 1.

In the polymers separated from the distillation column 32 after the chlorination process and from the distillation system 36 after the reaction process and the conversion process, about 20% to 40% by mass of high boiling point chlorosilanes. Specifically, for example, in the polymers, there is about 1% to 3% by mass of TCS, about 50% to 70% by mass of STC, about 12% to 20% by mass of $Si_2H_2Cl_4$, about 13% to 22% by mass of $Si_2Cl_6$, and about 3% to 6% by mass of other high boiling point chlorosilanes.

The polymers are introduced into the decomposing furnace 2 of the apparatus for producing trichlorosilane 1 together with hydrogen chloride. It is preferable that the quantity ratio of the hydrogen chloride to the polymer be 10% to 30% by mass of hydrogen chloride to the total amount of the polymer composition. When the amount of the hydrogen chloride is greater than the quantity ratio, the amount of unreacted hydrogen chloride increases, which is not preferable. On the other hand, when the amount of the polymer is greater than the quantity ratio, a large amount of silicon powder is generated, and the burden for the maintenance of the equipment increases, resulting in a significant reduction in operation efficiency.

Polymer reacts with hydrogen chloride at high temperatures of 450° C. or higher and is converted into TCS. It is preferable that the temperature in the decomposing furnace 2, specifically, the temperature in the reaction chamber 13 be equal to or higher than 450° C. and equal to or lower than 700° C. When the temperature in the furnace is lower than 450° C., the decomposition of polymer does not sufficiently occur. When the temperature in the furnace is higher than 700° C., the produced TCS reacts with hydrogen chloride and STC generates, so that the recovery efficiency of TCS tends to decrease, which is not preferable.

In addition, polymers include TCS, STC, and high boiling point chlorosilanes having higher boiling points than that of STC, for example, tetrachlorodisilane ($Si_2H_2Cl_4$), hexachlorodisilane ($Si_2Cl_6$). Decomposition reactions from high boiling point chlorosilanes into TCS include reactions represented as following reaction formulas (i) to (iii):

(1) Decomposition reaction of tetrachlorodisilane ($Si_2H_2Cl_4$)

$$Si_2H_2Cl_4 + HCl \rightarrow SiH_2Cl_2 + SiHCl_3 \quad \text{(i)}$$

$$Si_2H_2Cl_4 + 2HCl \rightarrow 2SiHCl_3 + H_2 \quad \text{(ii)}$$

(2) Decomposition reaction of hexachlorodisilane ($Si_2Cl_6$)

$$Si_2Cl_6 + HCl \rightarrow SiHCl_3 + SiCl_4 \quad \text{(iii)}$$

In addition, during the reactions, when moisture ($H_2O$) in the hydrogen chloride gas reacts with TCS or STC, silicon oxide is precipitated according to the following reaction formula (iv) and (v).

$$SiHCl_3 + 2H_2O \rightarrow SiO_2 + H_2 + 3HCl \quad \text{(iv)}$$

$$SiCl_4 + 2H_2O \rightarrow SiO_2 + 4HCl \quad \text{(v)}$$

When a polymer and hydrogen chloride are respectively supplied from the polymer supplying system 11 and the hydrogen chloride supplying system 12 to the raw material supplying tube 3, while the decomposing furnace 2 is heated by the heating unit 8, the polymer and the hydrogen chloride become a fluid mixture in the raw material supplying tube 3 and are supplied to the reaction chamber 13 through the lower end opening 3a. In this case, since the raw material supplying tube 3 is provided in the cylindrical furnace main body 5 along the longitudinal direction of furnace main body 5 and the fin 14 formed integrally with the outer peripheral surface of the raw material supplying tube 3 is close to the inner peripheral surface of the furnace main body 5. Therefore, the heat from the heating unit 8 on the outer side of the furnace main body 5 is transferred through the reaction chamber 13 and the fin 14 around the raw material supplying tube 3, and the internal fluid mixture is preheated by the heat. Accordingly, most of the fluid mixture is evaporated and gasified, and the fluid mixture is introduced into the reaction chamber 13 through the lower end opening 3a of the raw material supplying tube 3.

In addition, the fluid mixture introduced into the reaction chamber 13 forms an upstream flow and flows upwardly from the bottom in the reaction chamber 13. However, since the fin 14 protrudes from the raw material supplying tube 3 in the reaction chamber 13, the fluid mixture rises while being guided to the rear side of the fin 14. The fin 14 is spiral and is arranged to spirally partition the space substantially in the reaction chamber 13, so that the fluid mixture forms a spiral flow along the fin 14 and rises upward while being agitated. In the meantime, the fluid mixture is heated by heat transfer from the inner peripheral surface of the furnace main body 5, the surface of the fin 14, and the like to accelerate the reaction, and is converted into TCS to be discharged through the gas discharge tube 4.

Hydrogen chloride remains in the produced gas containing TCS discharged from the gas discharge tube 4. Therefore, in order to use the hydrogen chloride for a chloride reaction, the produced gas is introduced into the fluidizing chlorination furnace 31 in the polycrystalline silicon producing process as it is (see FIG. 4). Also the produced gas containing TCS is condensed so that the condensate is introduced into the distillation column 32 after the chlorination process and reused for the polycrystalline silicon producing process.

In the apparatus for producing TCS 1, the polymer and the hydrogen chloride are guided to the inner bottom portion of the decomposing furnace 2 by the raw material supplying tube 3 formed as a straight cylinder, and introduced into the reaction chamber 13 which surrounds the raw material supplying tube 3 from the inner bottom portion thereof. In the reaction chamber 13, as shown as a dashed arrow of FIG. 1, the fluid mixture of the polymer and the hydrogen chloride comes in contact with the fin 14 and rises upward while moving spirally around the raw material supplying tube 3 to the top, and in the meantime, the fluid mixture is heated by the heat transfer from the inner peripheral surface of the furnace main body 5 and the surface of the fin 14 by the heating unit 8. In addition, due to the reaction chamber 13 being formed into a spiral shape by the fin 14, the reaction chamber 13 is a longer passage in a spiral direction than the longitudinal length, so that the temperature distribution in the reaction chamber 13 becomes more uniform, thereby achieving a highly efficient reaction.

In addition, since the raw material supplying tube 3 is formed as a straight cylinder and guides the polymer and the hydrogen chloride to rapidly reach the inner bottom portion of the decomposing furnace 2, the reaction between the polymer and the hydrogen chloride in the raw material supplying tube 3 is suppressed. Therefore, it is possible to suppress silicon oxide produced during the reaction from adhering to the inner surface of the raw material supplying tube 3. Therefore, it is possible to suppress a phenomenon in which the raw material supplying tube 3 is clogged up by the silicon oxide.

In addition, in the case where silicon oxide S is de'posited on the inner bottom portion of the furnace main body 5 as shown as a dashed line of FIG. 2 during the producing of TCS as described above, the operation of the decomposing furnace 2 is stopped, and a pressurized gas such as inert gas is injected from the pressurized gas injection tube 23. Then, the deposits of the silicon oxide S on the inner bottom portion are crushed by the pressure of the pressurized gas and broken into dust which floats such that the silicon oxide S can be removed from the furnace fluid discharge tube 24 along with the fluid in the furnace.

Figure 3A:
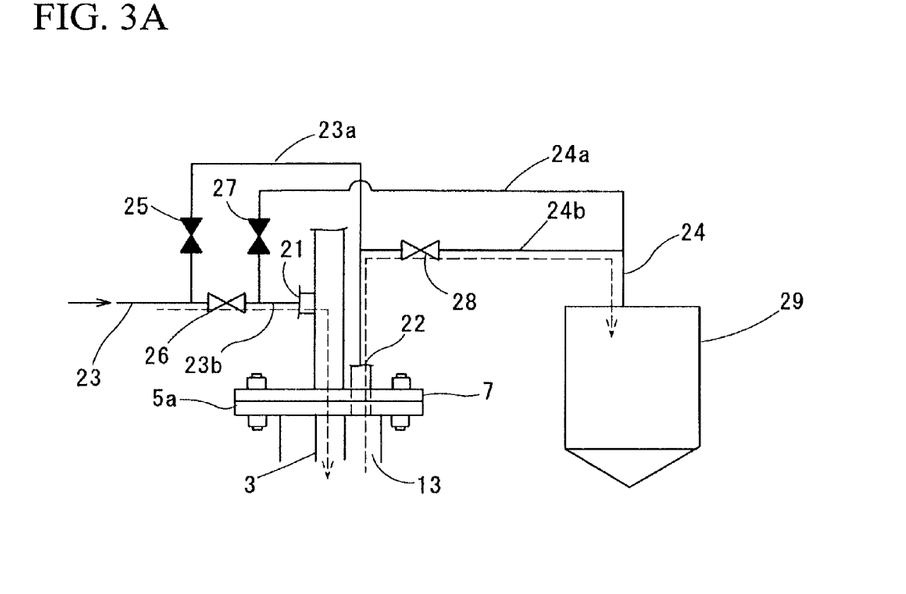
FIG. 3A is a plumbing diagram showing an example of discharging silicon oxide in a decomposing furnace by using the pressurized gas injection tube illustrated in FIG. 2.
Figure 3B:
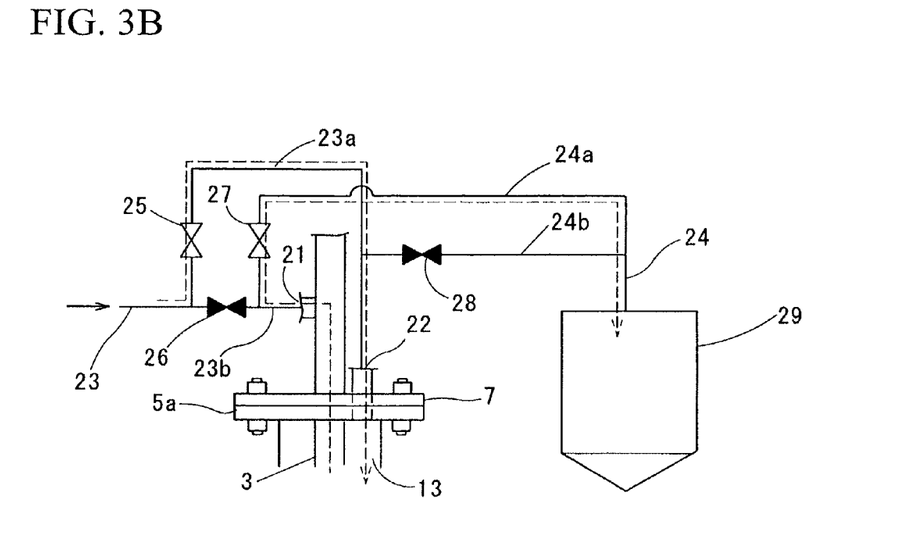
FIG. 3B is a plumbing diagram showing an example of discharging silicon oxide in a decomposing furnace by using the pressurized gas injection tube illustrated in FIG. 2.

A method of discharging the silicon oxide is described with reference to FIGS. 3A and 3B. As illustrated in FIG. 3A, the opening and the closing of the valves 25 to 28 are controlled. First, the valves 26 and 28 are opened and the valves 25 and 27 are closed to connect the pressurized gas injection tube 23 to the communicating port 21 in the raw material supplying tube 3, connect the furnace fluid discharge tube 24 to the communicating port 22 in the reaction chamber 13 (in the figure, a black valve represents a closed state, and a white valve represents an open state). In addition, as shown as a dashed arrow of FIG. 3A, a pressurized gas is injected into the decomposing furnace 2 through the raw material supplying tube 3 via the branch tube 23b, and silicon oxide on the inner bottom portion is then crushed into dust and floats and is removed from the reaction chamber 13 via the furnace fluid discharge tube 24 to the cyclone 29. After a predetermined time, as illustrated in FIG. 3B, on the contrary to the case of FIG. 3A, the opening and the closing of the valves 25 to 28 are changed to inject the pressurized gas from the furnace fluid discharge tube 24 to the reaction chamber 13, and to discharged from the raw material supplying tube 3. By repeating this, the inside of the decomposing furnace 2 is cleaned. In this case, the state illustrated in FIG. 3A and the state illustrated in FIG. 3B are not switched, and cleaning may be performed in only one state thereof.

The discharged silicon oxide is collected in the cyclone 29 and sent to the processing system 30. In addition, although a small amount of silicon oxide adheres to the inside of the lower end opening 3a of the raw material supplying tube 3, it can be removed by the above-mentioned operation. However, since the raw material supplying tube 3 is formed as the straight cylinder, for example, the silicon oxide can be easily taken off by inserting a bar-shaped member from above.

Figure 5:
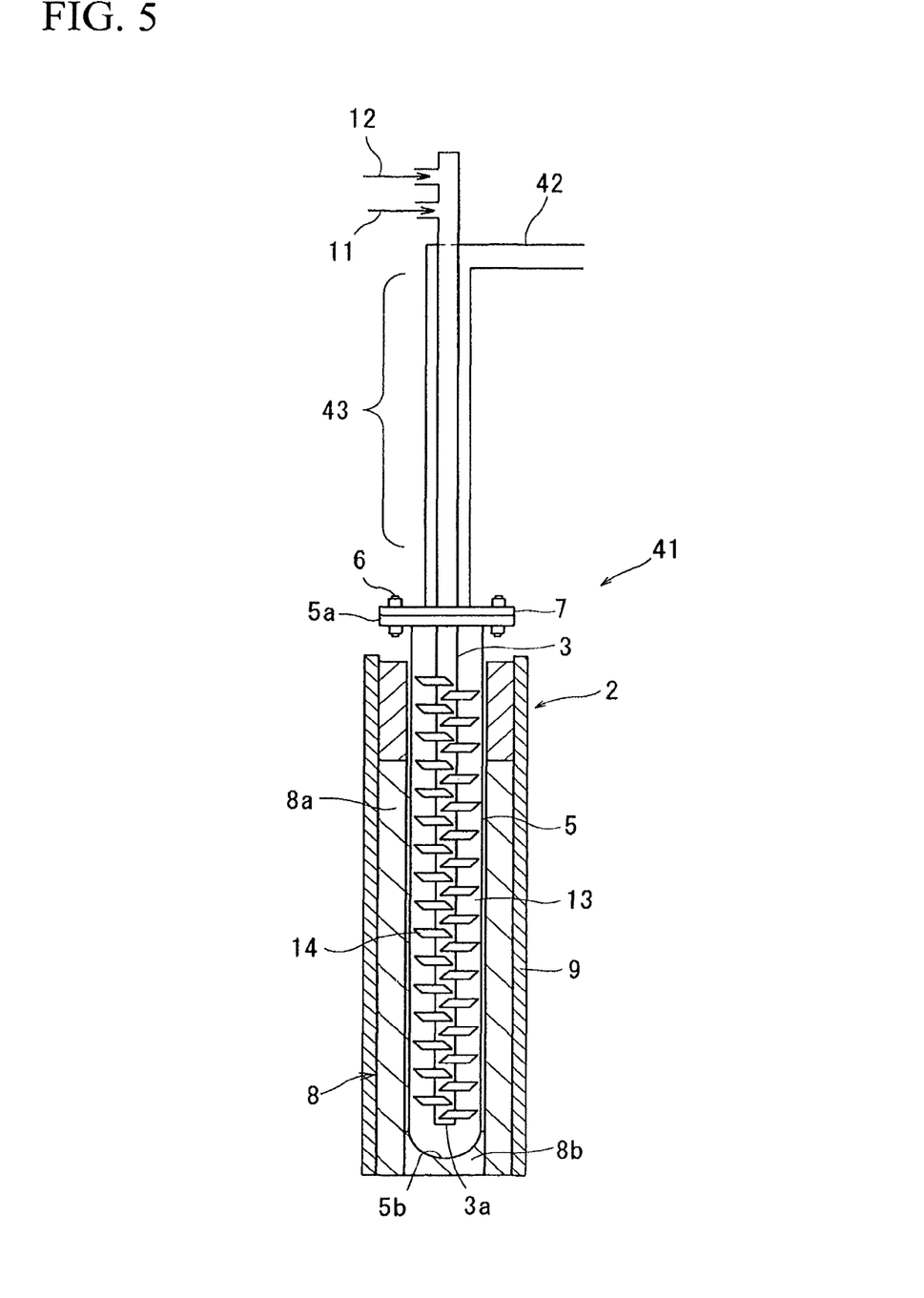
FIG. 5 is a longitudinal sectional view showing an apparatus for producing trichlorosilane according to a second embodiment of the present invention.

FIG. 5 illustrates an apparatus for producing TCS according to a second embodiment of the present invention.

In the apparatus for producing trichlorosilane 1 according to the first embodiment, the two gas discharge tubes 4 are connected to the end plate 7 of the decomposing furnace 2. However, in the apparatus for producing trichlorosilane 41 according to the second embodiment, a gas discharge tube 42 is formed as a cylinder which a diameter of the cylinder is larger than the raw material supplying tube 3 to surround the section of the raw material supplying tube 3 which protrudes upward from the decomposing furnace 2 such that the raw material supplying tube 3 and the gas discharge tube 42 are provided in a double-tube structure. In addition, the double-tube section extends upward from the decomposing furnace 2 by a predetermined length, and in the double-tube section, heat exchange occurs between the raw material fluid passing through the raw material supplying tube 3 and the reaction gas passing through the gas discharge tube 42. That is, the double-tube section functions as preheating unit 43 of the raw material fluid. Other configurations are the same as those of the first embodiment, and same elements are denoted by the same reference numerals, so that a description thereof will be omitted.

In the apparatus for producing trichlorosilane 41 having the above-mentioned configuration, the polymer and the hydrogen chloride introduced into the raw material supplying tube 3 is heated by heat from the reaction gas discharged from the decomposing furnace 2 at the section corresponding to the preheating unit 43 and is evaporated and gasified. The fluid mixture is introduced into the reaction chamber 13 through the lower end opening 3a of the raw material supplying tube 3, so that the reaction in the reaction chamber 13 effectively occurs.

Figure 6:
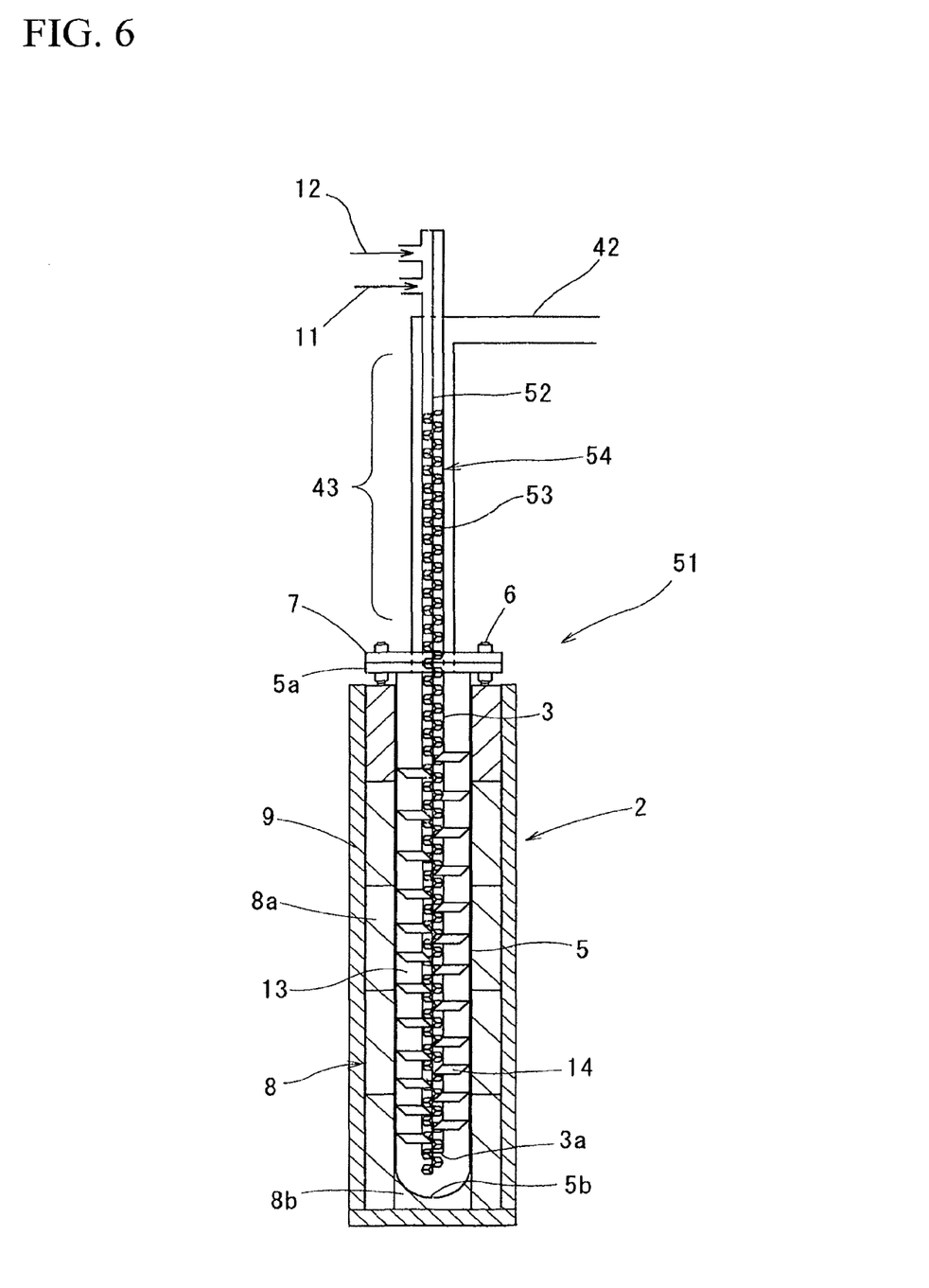
FIG. 6 is a longitudinal sectional view showing an apparatus for producing trichlorosilane according to a third embodiment of the present invention.

FIG. 6 illustrates an apparatus for producing TCS according to a third embodiment of the present invention.

The apparatus for producing trichlorosilane 51 is provided with an agitating member 54 formed by fixing a second fin 53 to the periphery of a core bar 52 in the raw material supplying tube 3. In this case, the raw material supplying tube 3 is provided with the same preheating unit 43 as in the second embodiment, the agitating member 54 has a length extending downward from the preheating unit 43 to the vicinity of the inner bottom portion of the furnace main body 5, and the front end portion thereof protrudes from the lower end opening 3a of the raw material supplying tube 3.

In this case, the upper end of the agitating member 54 is supported by the wall of the raw material supplying tube 3, and by removing the support to the upper end, the agitating member 54 can be moved vertically or rotated. Other configurations are the same as those of the first embodiment, and same elements are denoted the same reference numerals, so that a description thereof will be omitted.

In the apparatus for producing trichlorosilane 51, the raw materials are supplied separately by the polymer supplying system 11 and the hydrogen chloride supplying system 12 to the raw material supplying tube 3, and are mixed with each other in the raw material supplying tube 3 and introduced into the reaction chamber 13. The raw materials are effectively mixed with each other by the agitating member 54 provided in the raw material supplying tube 3, so that it is possible to further enhance reaction efficiency in the reaction chamber 13 after the raw materials are introduced through the lower end opening 3a of the raw material supplying tube 3.

In addition, the agitating member 54 can be moved vertically or rotated. Accordingly, in the case where silicon oxide is adhered to the vicinity of the lower end opening 3a of the raw material supplying tube 3, by vertically moving or rotating the agitating member 54 during maintenance, the silicon oxide can be securely removed and silicon oxide deposited on the inner bottom portion of the furnace main body 5 can be crushed. Therefore, it is possible to effectively perform the discharging of the silicon oxide by injecting the pressurized gas from the pressurized gas injection tube 23 explained in the description of the apparatus for producing TCS of the first embodiment.

In addition, the agitating member 54 may also be provided only in the preheating unit 43.

Figure 7:
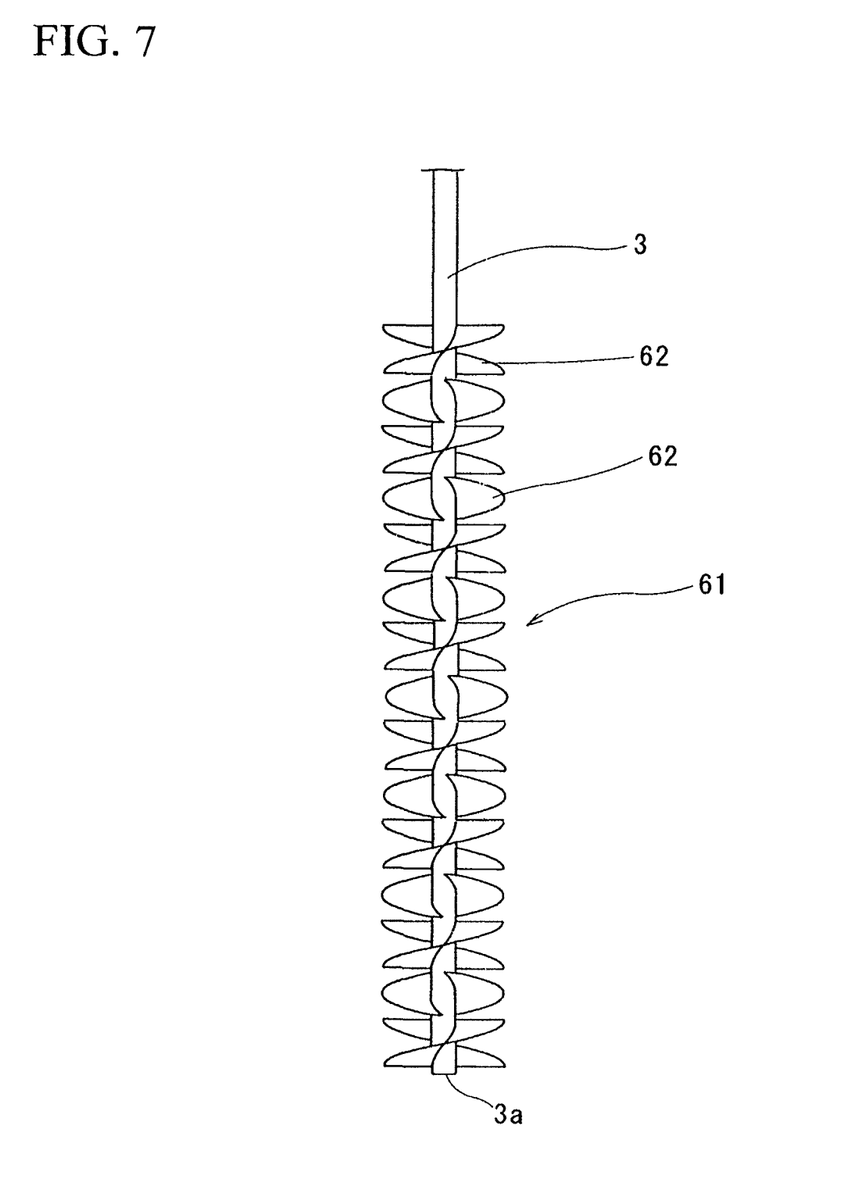
FIG. 7 is a front view showing a raw material supplying tube having a modified example of a fin used for the apparatus for producing trichlorosilane of the present invention.
Figure 8:
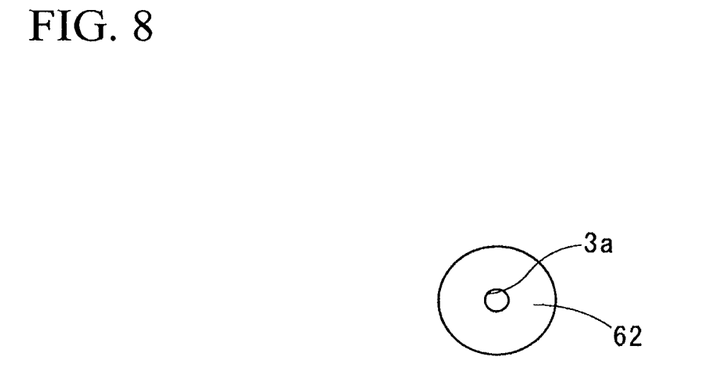
FIG. 8 is a bottom view of FIG. 7.

FIGS. 7 and 8 illustrate a modified example of a fin in the apparatus for producing TCS of the present invention.

A fin 61 has a structure of a so-called static mixer. That is, the fin 61 is configured by arranging plural elements 62 in the longitudinal direction of the raw material supplying tube 3, and the plural elements are formed by twisting rectangular plate members in a reverse direction at 180° and are alternately shifted at 90°. Due to the fin 61 having the static mixer structure, fluid is agitated and mixed in combination of a dividing operation of dividing the fluid into two flows whenever the fluid passes through the single element 62, a mixing (or converting) operation of moving the fluid from the center to the outside or from the outside to the center along the twisted surface of the element 62, and a reversing operation of reversing the rotation direction at every element 62 for agitating.

By providing the fin 61 having the static mixer structure on the outer peripheral surface of the raw material supplying tube 3, agitating and mixing in the reaction chamber 13 can be effectively performed, thereby further enhancing reaction efficiency.

In addition, in the case of the fin 61 having the static mixer structure, since the fin 61 is arranged to be shifted at 90°, at least two fins are needed. Depending on the capacity of the decomposing furnace, 5 to 20 fins may be provided.

Figure 9:
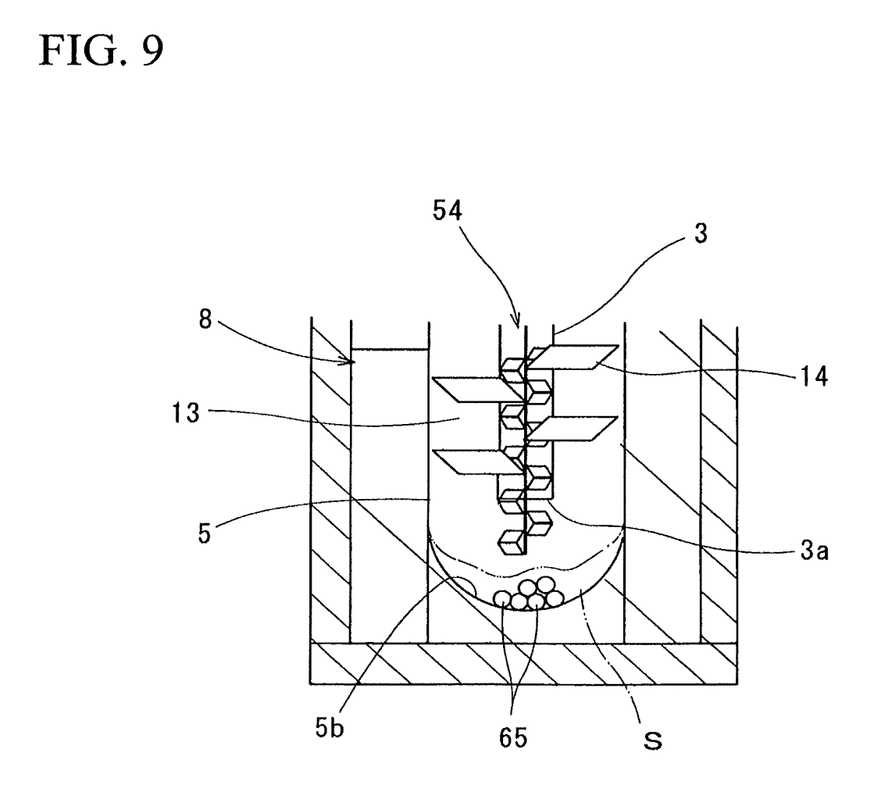
FIG. 9 is a longitudinal sectional view of the main part showing an example of providing a rolling member in a decomposing furnace of the apparatus for producing trichlorosilane according to the third embodiment of FIG. 6.

In addition, in the apparatus for producing TCS of the embodiments, as illustrated in FIG. 9, plural spherical rolling members 65 made of stainless steel or the like may be provided on the inner bottom portion of the furnace main body 5. In FIG. 9, an example provided with the agitating member 54 of the third embodiment is shown. In this case, by vertically moving or rotating the agitating member 54, the rolling members 65 can be swung along the inner bottom surface 5b of the furnace main body 5, so that the silicon oxide S can be reliably crushed by the rolling movement.

The present invention is not limited to the embodiments, and various modifications can be made without departing from the spirit and scope of the present invention.

For example, in the embodiments, the fin is fixed to the outer peripheral surface of the raw material supplying tube. However, the fin may be fixed to the inner peripheral surface of the furnace main body with a gap from the raw material supplying tube.

In addition, in order for the gas injected from the pressurized gas injection tube 23 to easily reach the inner bottom surface 5b of the furnace main body 5, a hole may be provided along the injection direction to the fin 14 existing in the injection direction.

In addition, in the second and third embodiments of FIGS. 5 and 6, a fin for heat transfer may be provided to the outside of the section of the raw material supplying tube 3 corresponding to the preheating unit 43.

In addition, in the embodiments, polymer and hydrogen chloride are mixed with each other in the raw material supplying tube. However, a configuration may be employed in which the raw material supplying tube employs a double structure including an inner tube and an outer tube, hydrogen chloride is introduced through the inner tube, and a polymer is introduced between the inner and outer tubes. In the configuration, the polymer and hydrogen chloride are separately introduced in the raw material supplying tube, so that a reaction therebetween occurs after being introduced into the reaction chamber, thereby effectively preventing the raw material supplying tube from clogging up with silicon oxide. In this case, when the polymer flows in the outer tube while being in contact with the reaction chamber, the polymer is heated and gasified while flowing in the raw material supplying tube, thereby enabling an effective reaction in the reaction chamber.

In addition, in the embodiments, the furnace fluid discharge tube for discharging silicon oxide is provided in the end plate, however, may be provided to the bottom portion of the furnace main body.

In addition, in the embodiments, the fin is formed as a spiral shape. However, in place of such a continuous shape, plural fins may be arranged at intervals, and a straight or tubular shape may also be employed. For example, plural flat plate-shaped fins may be arranged at intervals in the longitudinal direction of the decomposing furnace, and in this case, the fins are shifted at predetermined angles such that portions thereof vertically overlap.

What is claimed is:

1. An apparatus for producing trichlorosilane which decomposes polymer containing high boiling point chlorosilanes generated in a polycrystalline silicon producing process, in a trichlorosilane producing or in a converting process, thereby producing trichlorosilane, the apparatus comprising:
   a decomposing furnace reacting a hydrogen chloride with the polymer at high temperatures for producing trichlorosilane;
   a heating unit heating the inside of the decomposing furnace;
   a raw material supplying tube for guiding the polymer and the hydrogen chloride to the inner bottom portion of the decomposing furnace along the longitudinal direction of the decomposing furnace and supplying to the decomposing furnace through a lower end opening of the raw material supplying tube;
   a reaction chamber provided between the outer peripheral surface of the raw material supplying tube and the inner peripheral surface of the decomposing furnace;
   a gas discharge tube for discharging reaction gas from the top of the reaction chamber; and
   a fin which guides the polymer and the hydrogen chloride supplied from the lower end opening of the raw material supplying tube to be agitated and rise upward and is formed integrally with the outer peripheral surface of the raw material supplying tube that faces a furnace main body of the decomposing furnace,
   wherein the heating unit includes a heater that surrounds an outer peripheral surface of the furnace main body, and the fin is constituted of plural elements arranged in a longitudinal direction of the raw material supplying tube, where the plural elements are constituted of twisted rectangular plate members that are alternately twisted in a reverse direction.

2. The apparatus for producing trichlorosilane according to claim 1, wherein
   the raw material supplying tube is provided along the center axis of the decomposing furnace in the straight manner.

3. The apparatus for producing trichlorosilane according to claim 1, wherein
   a polymer supplying system and a hydrogen chloride supplying system are connected to an upper section of the raw material supplying tube which protrudes outward from the decomposing furnace, and
   an agitating member having a second fin is inserted into the raw material supplying tube.

4. The apparatus for producing trichlorosilane according to claim 1, wherein
   the gas discharge tube is formed in a double-tube structure to surround the periphery of the raw material supplying tube on the outside of the decomposing furnace.

5. The apparatus for producing trichlorosilane according to claim 1, further comprising a number of spherical rolling members provided on the inner bottom portion of the decomposing furnace.

6. The apparatus for producing trichlorosilane according to claim 1, wherein
the fin has heat conductive properties.

7. The apparatus for producing trichlorosilane according to claim 1, wherein a fin which guides the polymer and the hydrogen chloride supplied from the lower end opening of the raw material supplying tube to be agitated and rise upward and is formed integrally with the inner peripheral surface of the decomposing furnace.

8. An apparatus for producing trichlorosilane which decomposes polymer containing high boiling point chlorosilanes generated in a polycrystalline silicon producing process, in a trichlorosilane producing or in a converting process, thereby producing trichlorosilane, the apparatus comprising:
a decomposing furnace reacting a hydrogen chloride with the polymer at high temperatures for producing trichlorosilane;
a heating unit heating the inside of the decomposing furnace;
a raw material supplying tube for guiding the polymer and the hydrogen chloride to the inner bottom portion of the decomposing furnace along the longitudinal direction of the decomposing furnace and supplying to the decomposing furnace through a lower end opening of the raw material supplying tube;
a reaction chamber provided between the outer peripheral surface of the raw material supplying tube and the inner peripheral surface of the decomposing furnace;
a gas discharge tube for discharging reaction gas from the top of the reaction chamber; and
a fin which guides the polymer and the hydrogen chloride supplied from the lower end opening of the raw material supplying tube to be agitated and rise upward and is formed integrally with the outer peripheral surface of the raw material supplying tube that faces a furnace main body of the decomposing furnace,
wherein the heating unit includes a heater that surrounds an outer peripheral surface of the furnace main body, and the decomposing furnace is provided with a pressurized gas injection tube for injecting pressurized gas into the decomposing furnace and a furnace fluid discharge tube for discharging fluids in the furnace expelled by the pressurized gas.

9. The apparatus for producing trichlorosilane according to claim 8, wherein
the fin is provided with a hole along injection direction of the pressurized gas.

10. The apparatus for producing trichlorosilane according to claim 8, wherein the furnace fluid discharge tube is connected to a cyclon where silicon oxide is collected.

11. The apparatus for producing trichlorosilane according to claim 8, further comprising
a first branch tube having a first valve, a second branch tube having a second valve,
a third branch tube having a third valve, and a fourth branch tube having a fourth valve,
a first communicating port that communicates the first branch tube and the raw material supplying tube, and
a second communicating port that communicates the second branch tube and the reaction chamber,
wherein the pressurized gas injection tube is communicated to the raw material supplying tube via the first valve and the first communicating port,
the reaction chamber is communicated to the furnace fluid discharge tube via the second communicating port and the second valve,
the pressurized gas injection tube is communicated to the furnace fluid discharge tube via the third valve and the second valve through the third branch tube and the second branch tube, and the pressurized gas injection tube is communicated to the furnace fluid discharge tube via the first valve, fourth valve through the first branch tube and the fourth branch tube.

12. The apparatus for producing trichlorosilane according to claim 8, wherein a fin which guides the polymer and the hydrogen chloride supplied from the lower end opening of the raw material supplying tube to be agitated and rise upward and is formed integrally with the inner peripheral surface of the decomposing furnace.

13. An polycrystalline silicon producing system comprising:
a fluidizing chlorination furnace that produces crude trichlorosilane by reacting metallurgical silicon and hydrogen chloride with each other;
a distillation column that distills a gas containing the crude trichlorosilane produced in the fluidizing chlorination furnace,
an evaporator that evaporates the trichlorosilane and silicon tetrachloride to form a raw material gas of polycrystalline silicon,
a reactor that produces polycrystalline silicon from the raw material gas supplied from the evaporator;
a condenser that separates chlorosilanes from a gas exhausted from the reactor;
a distillation system that fractionates chlorosilanes separated by the condenser to trichlorosilanes, silicon teterachloride, and polymer, and
an apparatus for producing trichlorosilane that decomposes polymer included in the residue recovered from the distillation column and/or the distillation system to convert the polymer into trichlorosilane,
wherein the apparatus for producing trichlorosilane comprises:
a decomposing furnace reacting a hydrogen chloride with the polymer at high temperatures for producing trichlorosilane;
a heating unit heating the inside of the decomposing furnace;
a raw material supplying tube for guiding the polymer and the hydrogen chloride to the inner bottom portion of the decomposing furnace along the longitudinal direction of the decomposing furnace and supplying to the decomposing furnace through a lower end opening of the raw material supplying tube;
a reaction chamber provided between the outer peripheral surface of the raw material supplying tube and the inner peripheral surface of the decomposing furnace;
a gas discharge tube for discharging reaction gas from the top of the reaction chamber; and
a fin which guides the polymer and the hydrogen chloride supplied from the lower end opening of the raw material supplying tube to be agitated and rise upward and is formed integrally with the outer peripheral surface of the raw material supplying tube that faces a furnace main body of the decomposing furnace,
wherein the heating unit includes a heater that surrounds an outer peripheral surface of the furnace main body.

14. The polycrystalline silicon producing system according to claim 13, wherein a fin which guides the polymer and the hydrogen chloride supplied from the lower end opening of the raw material supplying tube to be agitated and rise upward and is formed integrally with the inner peripheral surface of the decomposing furnace of the apparatus for producing trichlorosilane.

15. An apparatus for producing trichlorosilane which decomposes polymer containing high boiling point chlorosilanes generated in a polycrystalline silicon producing process, in a trichlorosilane producing or in a converting process, thereby producing trichlorosilane, the apparatus comprising:
- a decomposing furnace reacting a hydrogen chloride with the polymer at high temperatures for producing trichlorosilane;
- a heating unit heating the inside of the decomposing furnace;
- a raw material supplying tube for guiding the polymer and the hydrogen chloride to the inner bottom portion of the decomposing furnace along the longitudinal direction of the decomposing furnace and supplying to the decomposing furnace through a lower end opening of the raw material supplying tube;
- a reaction chamber provided between the outer peripheral surface of the raw material supplying tube and the inner peripheral surface of the decomposing furnace;
- a gas discharge tube for discharging reaction gas from the top of the reaction chamber; and
- a fin which guides the polymer and the hydrogen chloride supplied from the lower end opening of the raw material supplying tube to be agitated and rise upward and is formed integrally with the outer peripheral surface of the raw material supplying tube that faces a furnace main body of the decomposing furnace,
- wherein the heating unit includes a heater that surrounds an outer peripheral surface of the furnace main body, a polymer supplying system and a hydrogen chloride supplying system are connected to an upper section of the raw material supplying tube which protrudes outward from the decomposing furnace, and an agitating member having a second fin is inserted into the raw material supplying tube.

16. The apparatus for producing trichlorosilane according to claim 15, wherein a fin which guides the polymer and the hydrogen chloride supplied from the lower end opening of the raw material supplying tube to be agitated and rise upward and is formed integrally with the inner peripheral surface of the decomposing furnace.

17. An apparatus for producing trichlorosilane which decomposes polymer containing high boiling point chlorosilanes generated in a polycrystalline silicon producing process, in a trichlorosilane producing or in a converting process, thereby producing trichlorosilane, the apparatus comprising:
- a decomposing furnace reacting a hydrogen chloride with the polymer at high temperatures for producing trichlorosilane;
- a heating unit heating the inside of the decomposing furnace;
- a raw material supplying tube for guiding the polymer and the hydrogen chloride to the inner bottom portion of the decomposing furnace along the longitudinal direction of the decomposing furnace and supplying to the decomposing furnace through a lower end opening of the raw material supplying tube;
- a reaction chamber provided between the outer peripheral surface of the raw material supplying tube and the inner peripheral surface of the decomposing furnace;
- a gas discharge tube for discharging reaction gas from the top of the reaction chamber; and
- a fin which guides the polymer and the hydrogen chloride supplied from the lower end opening of the raw material supplying tube to be agitated and rise upward and is formed integrally with the outer peripheral surface of the raw material supplying tube that faces a furnace main body of the decomposing furnace,
- the heating unit includes a heater that surrounds an outer peripheral surface of the furnace main body, and
- a number of spherical rolling members provided on the inner bottom portion of the decomposing furnace.

18. The apparatus for producing trichlorosilane according to claim 17, wherein a fin which guides the polymer and the hydrogen chloride supplied from the lower end opening of the raw material supplying tube to be agitated and rise upward and is formed integrally with the inner peripheral surface of the decomposing furnace.

* * * * *